(12) United States Patent
Moon (10) Patent No.: US 12,263,756 B2
(45) Date of Patent: Apr. 1, 2025

(54) BI-MATERIAL ELECTRIC VEHICLE BATTERY DISCONNECT

(71) Applicant: Polestar Performance AB, Gothenburg (SE)

(72) Inventor: Jongseok Moon, Gothenburg (SE)

(73) Assignee: POLESTAR PERFORMANCE AB, Gothenburg (SE)

( * ) Notice: Subject to any disclaimer, the term of this patent is extended or adjusted under 35 U.S.C. 154(b) by 474 days.

(21) Appl. No.: 17/566,571

(22) Filed: Dec. 30, 2021

(65) Prior Publication Data

US 2023/0211704 A1 Jul. 6, 2023

(51) Int. Cl.
| | |
|---|---|
| *B60L 58/22* | (2019.01) |
| *B60L 50/64* | (2019.01) |
| *B60L 58/27* | (2019.01) |
| *H01M 50/209* | (2021.01) |
| *H01M 50/502* | (2021.01) |
| *H02J 7/00* | (2006.01) |

(52) U.S. Cl.
CPC .............. *B60L 58/22* (2019.02); *B60L 50/64* (2019.02); *B60L 58/27* (2019.02); *H01M 50/209* (2021.01); *H01M 50/502* (2021.01); *H02J 7/0014* (2013.01); *H01M 2220/20* (2013.01)

(58) Field of Classification Search
CPC .......... B60L 58/22; B60L 58/27; B60L 50/64; H01M 50/502; H01M 50/209; H01M 2220/20; H02J 7/0014
See application file for complete search history.

(56) References Cited

U.S. PATENT DOCUMENTS

| | | | |
|---|---|---|---|
| 9,455,478 B2* | 9/2016 | He | H01M 10/625 |
| 10,103,374 B2* | 10/2018 | Balk | B60R 16/033 |
| 11,075,431 B2* | 7/2021 | Capati | H01M 50/213 |
| 2004/0146775 A1 | 7/2004 | Yoshizawa et al. | |

(Continued)

FOREIGN PATENT DOCUMENTS

| | | |
|---|---|---|
| CN | 203800141 U | 8/2014 |
| EP | 3671938 A1 | 6/2020 |

(Continued)

OTHER PUBLICATIONS

Application No. PCT/EP2022/087210 , International Search Report and Written Opinion, Mailed On Jun. 15, 2023, 7 pages.

*Primary Examiner* — Luis A Martinez Borrero
(74) *Attorney, Agent, or Firm* — Kilpatrick Townsend & Stockton LLP (57) ABSTRACT

An electric vehicle battery disconnect bracket configured disconnect one or more battery cells or modules experiencing a thermal event within a battery pack to mitigate propagation of the thermal event throughout the battery pack, including a bracket body formed of a first material on a first major surface of the body, and a second material on an opposing second major surface of the body, the first material having a larger coefficient of thermal expansion than the second material, such that an increase in temperature above a defined threshold experienced by the body causes the first material to expand more than the second material, thereby transitioning the body from a first equilibrium state representing a closed, conductive position to a second equilibrium state representing an open, isolation position.

19 Claims, 5 Drawing Sheets

(56) References Cited

U.S. PATENT DOCUMENTS

| | | | | |
|---|---|---|---|---|
| 2008/0315839 A1* | 12/2008 | Hermann | ............. | G01J 5/0096 |
| | | | | 320/136 |
| 2009/0139781 A1* | 6/2009 | Straubel | ................ | B60L 53/14 |
| | | | | 701/22 |
| 2012/0171523 A1* | 7/2012 | Yang | .................. | H01M 10/653 |
| | | | | 429/50 |
| 2015/0035641 A1 | 2/2015 | Mochizuki et al. | | |
| 2015/0072208 A1* | 3/2015 | Balk | ...................... | H05K 1/18 |
| | | | | 429/121 |
| 2015/0072209 A1* | 3/2015 | Tyler | ................. | H01M 10/482 |
| | | | | 429/159 |
| 2015/0229118 A1* | 8/2015 | Hasunuma | ............ | H02H 5/047 |
| | | | | 361/93.8 |
| 2018/0212288 A1* | 7/2018 | Grace | ................. | B60L 3/0046 |
| 2020/0075926 A1* | 3/2020 | Torok | .................. | H05K 7/1427 |
| 2020/0185671 A1* | 6/2020 | Ng | ................... | H01M 50/24 |
| 2021/0075076 A1* | 3/2021 | Kato | .................. | H01M 10/617 |
| 2021/0376403 A1* | 12/2021 | Schieler | ............. | H01M 10/647 |
| 2022/0158273 A1* | 5/2022 | Khateeb Razack | .......................... | |
| | | | | H01M 10/617 |
| 2022/0231375 A1* | 7/2022 | Thysted | .............. | H01M 50/583 |
| 2022/0328943 A1* | 10/2022 | Mueller | ............. | H01M 50/636 |
| 2023/0011587 A1* | 1/2023 | Yoon | ................... | H01M 10/625 |
| 2023/0016266 A1* | 1/2023 | Baseri | ................... | H01M 50/30 |
| 2023/0163406 A1* | 5/2023 | Moon | .............. | H01M 50/3425 |
| | | | | 429/89 |
| 2023/0318157 A1* | 10/2023 | Kim | ................ | H01M 10/4235 |
| | | | | 320/136 |
| 2024/0113354 A1* | 4/2024 | Moon | .................. | H01M 10/65 |
| 2024/0313302 A1* | 9/2024 | Williams | .......... | H01M 10/6567 |

FOREIGN PATENT DOCUMENTS

| | | |
|---|---|---|
| GB | 2513051 A | 10/2014 |
| JP | 2004273221 A | 9/2004 |
| JP | 2005285624 A | 10/2005 |

* cited by examiner

BI-MATERIAL ELECTRIC VEHICLE BATTERY DISCONNECT

TECHNICAL FIELD

The present disclosure relates generally to battery conditioning of an electric vehicle, and more particularly to a bi-material battery disconnect bracket, system and method configured to rapidly disconnect one or more battery cells or modules experiencing a thermal event, thereby mitigating propagation of the thermal event to other components of the battery system.

BACKGROUND

Electric vehicles are becoming increasingly popular as consumers look to decrease their environmental impact and improve air quality. Instead of a traditional internal combustion engine, electric vehicles include one or more motors, powered by a rechargeable battery pack. A common battery pack is made up of one or more battery modules, each module containing a plurality of battery cells, which act as galvanic cells when being discharged by converting chemical energy to electrical energy, and electrolytic cells when being recharged by converting electrical energy to chemical energy.

As is well known, these battery cells can generate heat in use, thus reducing the range of the electric vehicle and the durability and overall life of the battery cells making up the rechargeable battery pack. In rare cases, a single battery cell can overheat to the point of a thermal runaway, which can then propagate to the other battery cells and greatly reduce the longevity or the ability of the remaining cells to hold charge for an extended period of time. In extreme circumstances, the propagation of heat from the cell experiencing a thermal runaway can lead to a thermal runaway of the entire battery pack, thus destroying the battery pack and potentially the electric vehicle.

Although various systems have been developed over the years to regulate the temperature of the battery pack, further improvements in the ability to mitigate propagation of the thermal event for the use in a battery pack of an electric vehicle, and to decrease the chance that an overheated cell will affect any adjacent cell and/or the entire battery pack is desirable. The present disclosure addresses this concern.

SUMMARY OF THE DISCLOSURE

Embodiments of the present disclosure provide systems and methods for mitigating propagation of a thermal event in an energy storage system having a plurality of cells by rapidly disconnecting a battery cell following a perceived a thermal event. For example, in some embodiments, the disclosed systems and methods can isolate a battery cell experiencing the onset of a thermal event, then rapidly discharge the electrical potential from the cell in a manner that decreases a likelihood of a propagation of heat from the cell to one or more adjacent cells within the battery pack.

One embodiment of the present disclosure provides an electric vehicle battery disconnect bracket configured disconnect one or more battery cells or modules experiencing a thermal event within a battery pack to mitigate propagation of the thermal event throughout the battery pack, including a bracket body formed of a first material on a first major surface of the body, and a second material on an opposing second major surface of the body, the first material having a larger coefficient of thermal expansion than the second material, such that an increase in temperature above a defined threshold experienced by the body causes the first material to expand more than the second material, thereby transitioning the body from a first equilibrium state representing a closed, conductive position to a second equilibrium state representing an open, isolation position.

In one embodiment, the first material comprises at least one of a metal, alloy, polymer, or composite, and the second material comprises at least one of an electrically conductive metal having a different coefficient of thermal expansion than the first material. In one embodiment, the second material comprises at least one of a copper or aluminum alloy. In one embodiment, the bracket is a bistable bimetallic element. In one embodiment, the bracket is tuned to transition from the first equilibrium state to the second equilibrium state at a designated temperature in a range of between about 100° C. and about 180° C. in one embodiment, the bracket is tuned to transition from the first equilibrium state to the second equilibrium state at a temperature above about 140° C. In one embodiment, the bracket is configured to transition from the second equilibrium state to the first equilibrium state at a temperature below about 140° C.

Another embodiment of the present disclosure provides an electric vehicle battery disconnect system configured to disconnect one or more battery cells or modules experiencing a thermal event within a battery pack to mitigate propagation of the thermal event, including an electronic control unit, and a deformable connection body formed of a first material on a first major surface of the body, and a second material on an opposing second major surface of the body, the first material having a larger coefficient of thermal expansion than the second material, such that an increase in temperature above a defined threshold experienced by the body causes the first material to expand more than the second material, thereby transitioning the body from a first equilibrium state representing a closed, conductive position configured to electrically couple a first terminal of a first battery cell or module to a second terminal of a second battery cell or module, to a second equilibrium state representing an open, isolation position configured to decouple the first terminal from the second terminal to at least partially isolate one cell of the plurality of cells, wherein in the second equilibrium state the body is further configured to close a circuit of the electronic control unit, enabling the electronic control unit to perform one or more functions on the at least partially isolated cell.

In one embodiment, the system further includes one or more sensors configured to sense at least one of a temperature, pressure, voltage, or amperage of the at least partially isolated cell. In one embodiment, the electronic control unit is configured to evaluate at least one of a temperature, pressure, voltage, or amperage of the isolated cell to confirm whether the at least partially isolated cell is experiencing a thermal event. In one embodiment, the electronic control unit is configured to rapidly discharge an electrical potential from the at least partially isolated cell through one or more resisters. In one embodiment, the electronic control unit is configured to affect a transfer of electrical potential from the at least partially isolated cell to one or more other battery cells within the battery pack.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Figure 1:
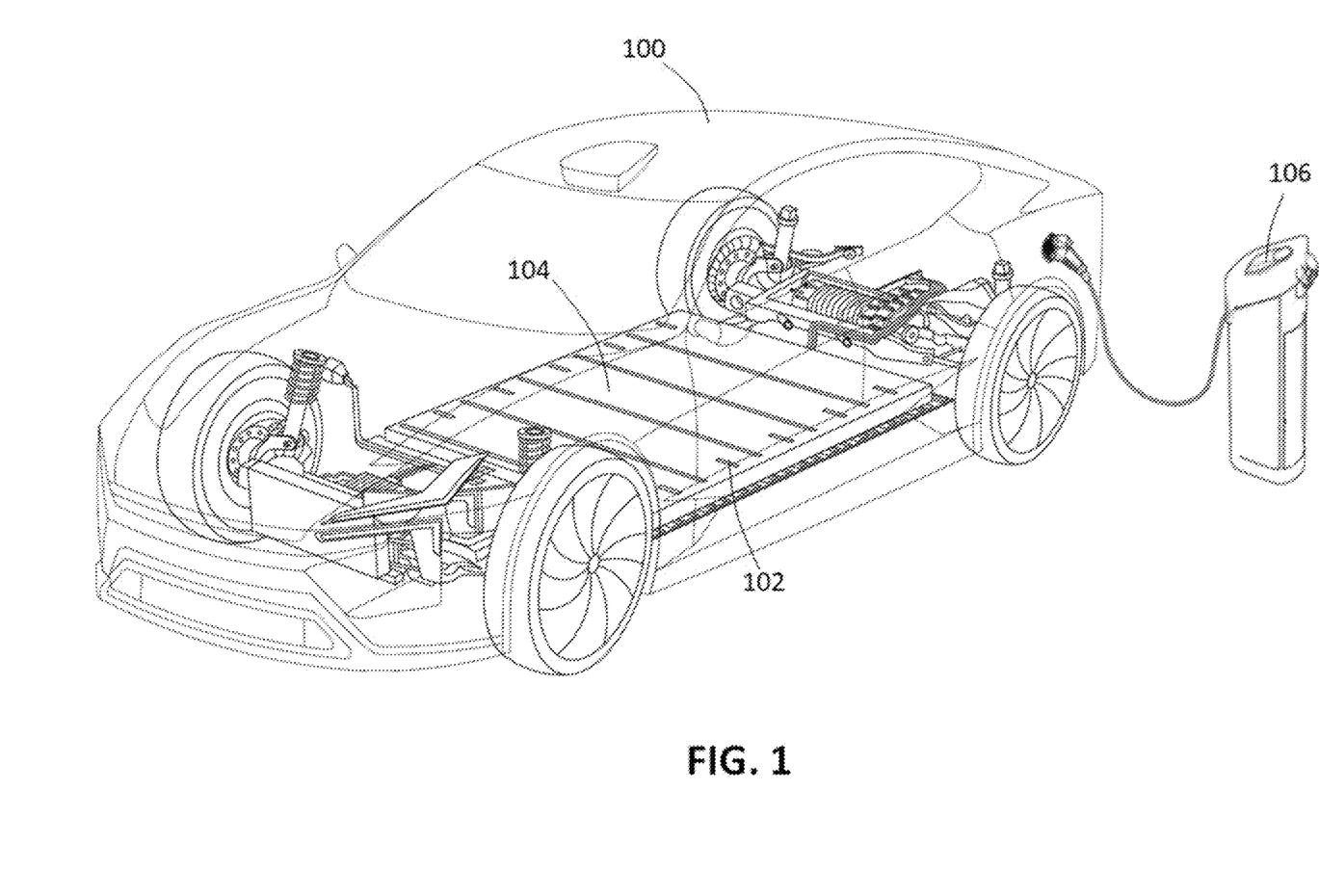
FIG. 1 is a perspective view depicting an electric vehicle comprising a battery disconnect system configured to rapidly disconnect one or more battery cells or modules experiencing a thermal event, thereby mitigating propagation of the thermal event to other components of the battery system, in accordance with an embodiment of the disclosure.

Referring to FIG. 1, an electric vehicle 100 comprising a bi-material battery disconnect system 102 configured to rapidly disconnect one or more battery cells or modules experiencing a thermal event to mitigate propagation of the thermal event throughout a battery pack 104, is depicted in accordance with an embodiment of the disclosure. As depicted, the battery pack 104 can represent a sealed battery cell compartment containing clusters of individual battery cells (sometimes referred to as "battery modules") and other battery related components. The assembled battery pack 104 can be mounted to the frame or chassis of the vehicle 100 and in some embodiments can be positioned adjacent to a cabin floor of the vehicle 100, thereby maintaining a low center of gravity. For example, the battery pack 104 may be positioned below the passenger compartment, which is generally considered an ideal location as the battery pack 104 maintains a low center of gravity of the vehicle 100, and is spaced away from the outer body of the vehicle, and therefore less prone to being damaged in a collision.

Various embodiments of the present disclosure will be described in detail with reference to the drawings, wherein like reference numerals represent like parts and assemblies throughout the several views. Various directions and orientations, such as "upward," "downward," "top," "bottom," "upper," "lower", etc. are generally described herein with reference to the drawings in the usual gravitational frame of reference, regardless of how the components may be oriented.

Additionally, the terms "battery," "cell," and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configurations. The term "battery pack" as used herein refers to multiple individual batteries contained within a single piece or multi-piece housing, the individual batteries electrically interconnected to achieve the desired voltage and capacity for a particular application. The term "electric vehicle" as used herein may refer to an all-electric vehicle, also referred to as an EV, a plug-in hybrid vehicle, also referred to as a PHEV, or a hybrid vehicle, also referred to as a HEV, where a hybrid vehicle refers to a vehicle utilizing multiple propulsion sources one of which is an electric drive system.

Figure 2:
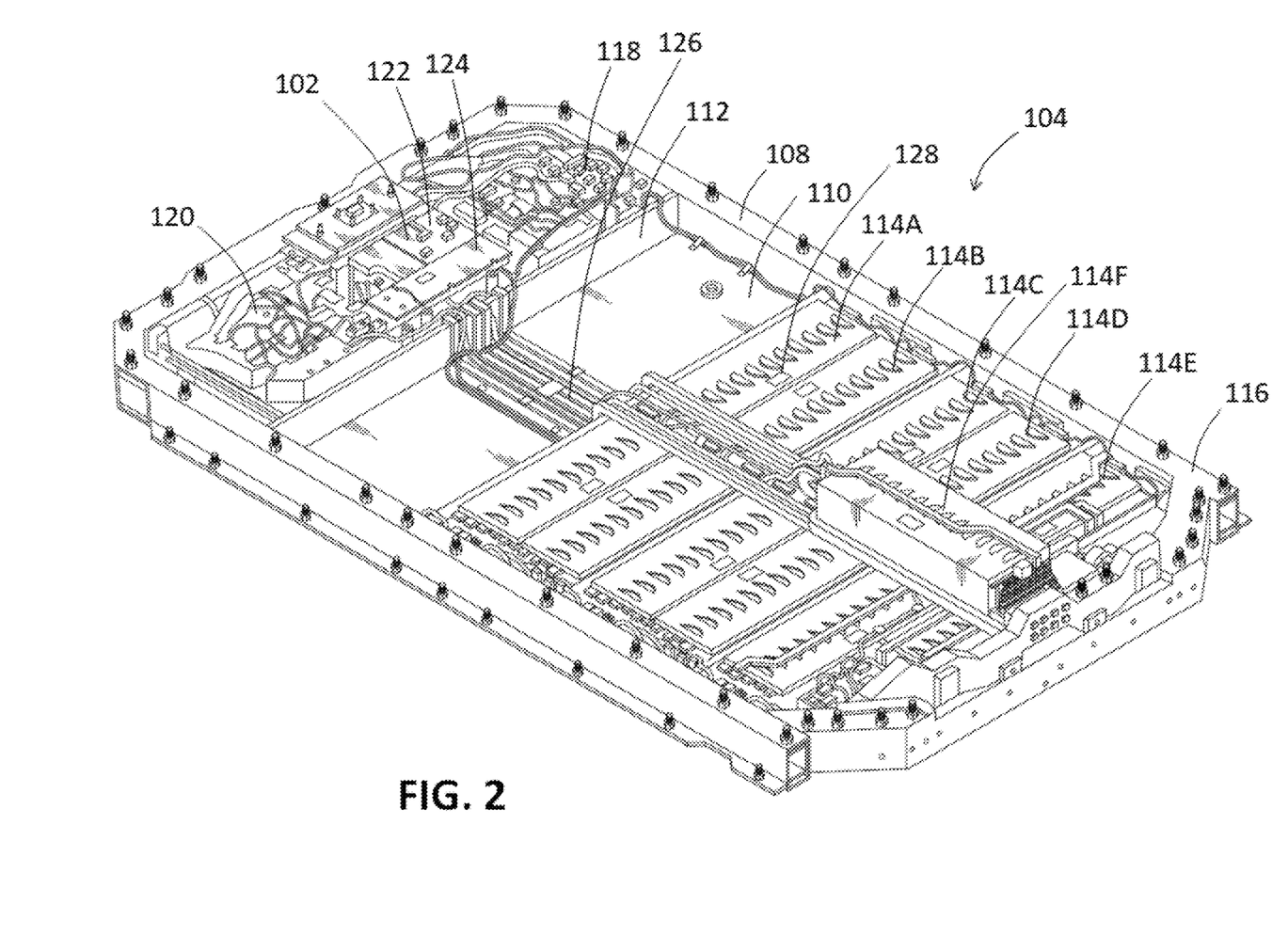
FIG. 2 is an exploded perspective view depicting an electric vehicle battery pack comprising a battery disconnect system configured to rapidly disconnect one or more battery cells or modules experiencing a thermal event, thereby mitigating propagation of the thermal event to other components of the electric vehicle battery pack, in accordance with an embodiment of the disclosure.

With additional reference to FIG. 2, an perspective view of an electric vehicle battery pack 104 comprising the bi-material battery disconnect system 102 configured to rapidly disconnect or isolate one or more battery cells or modules experiencing a thermal event from other components of the battery pack 104, is depicted in accordance with an embodiment of the disclosure. As depicted, the battery pack 104 can include a rigid outer shell, sometimes referred to as a "battery tray" 108, representing a bottom and one or more sides of a structural vessel defining a compartment 110. Further, in embodiments, the battery tray 108 can include one or more structural supports, such as cross members 112, which can provide structural support to the battery pack 104, as well as surfaces within the compartment 110 on which other components of the battery pack can be affixed.

As further depicted, individual battery cells within the battery pack 104 can be grouped into distinct clusters 114A-F (sometimes referred to as "battery modules"). In addition to the battery modules 114A-F, a variety of components can be packed into the compartment 110 before a cover is affixed to a top surface 116 of the battery tray 108, thereby sealing the compartment 110. In some embodiments, the components can include an electrical current transmission system 118, safety system 120, battery management system 122 (including current management system 124), and a battery bus bar 126 interconnecting the various components 114A-F, 120, 122, and 124. Once the components have been positioned within the compartment 110, a cover can be affixed to the top surface 116 via a plurality of fasteners, adhesive, or a combination thereof.

In some embodiments, the battery management system 122 or other components of the multi-cell battery pack can include one or more sensors 128 for monitoring a physical state of the individual cells during operation. Such sensors include, but are not limited to measurement of temperature, pressure, voltage, amperage, and other ambient conditions (e.g., the presence of smoke or fumes, the presence of liquid, etc.) within the battery tray 108. Data from the sensors 128 can then be used by hardware and software to make intelligent decisions to control a characteristic of the individual cells, so that the characteristic within any individual cell stays within an acceptable operating range. Additionally, the battery management system 122, sometimes in combination with the electrical current transmission system 118, can be configured to enable information gathered by the one or more sensors 128 to flow into and out of the battery pack 104. The battery management system 122 can include mixed signal integrated circuits that incorporate both analog and digital circuits, such as one or more types of digital memory and special registers to hold battery data.

With continued reference to FIG. 1, in some embodiments, the battery pack 104 can be actively charged by an external charging station 106. During recharge the individual battery cells act as electrolytic cells by converting electrical energy to chemical energy, which in some cases can generate a significant amount of heat. Generally, the amount of heat generated by a battery pack 104 during recharge is the square of the rate of electrical charging. Therefore, for modern high-capacity batteries that charge at fast rates, very large amounts of heat can be generated. In particular, modern charging systems such as direct current fast charging ("DCFC") and other "level 3" charging systems are designed to charge at high rates of around 50 kW or more. The battery pack 104 must nonetheless be maintained within a safe operating temperature while charging, in order to ensure that the battery cells are not damaged or degraded.

Once the battery pack 104 has been charged, during vehicle operation the individual battery cells discharge energy as galvanic cells by converting chemical energy to electrical energy (e.g., for use by the electric motors). During high rates of discharge (e.g., when the vehicle is under heavy acceleration and/or driving up a hill, etc.), the individual cells can generate a significant amount of heat. The heat produced by a high rate of discharge within an individual cell is generally a function of an electrical current and an internal electrical resistance of the cell. The cells are generally more sensitive to high temperatures when a voltage within the cell is relatively high. This volatility is dependent upon cell chemistry (e.g., lithium-ion reaction, etc.) and varies among different types of cells contemplated for use.

It has been observed that optimal battery cell performance is more likely to occur within a desired temperature range (e.g., 40-45° C., etc.), with a maximum/not to exceed temperature (e.g., 60° C.) being above the desired temperature range. In rare cases, individual battery cells within a battery pack 104 can exhibit thermal characteristics above a desired temperature range (e.g., above the maximum/not to exceed temperature), which may result in a failure (e.g., thermal runaway, etc.) of the individual cell. During such an occurrence, heat energy from the cell exhibiting the thermal characteristics can propagate into nearby and adjacent cells, thereby creating the potential for a chain reaction thermal event across multiple battery cells. For example, self-ignition of a battery cell may occur when the temperature of the cell reaches a temperature in a range of between about 120° C. and about 150° C.

Figure 3:
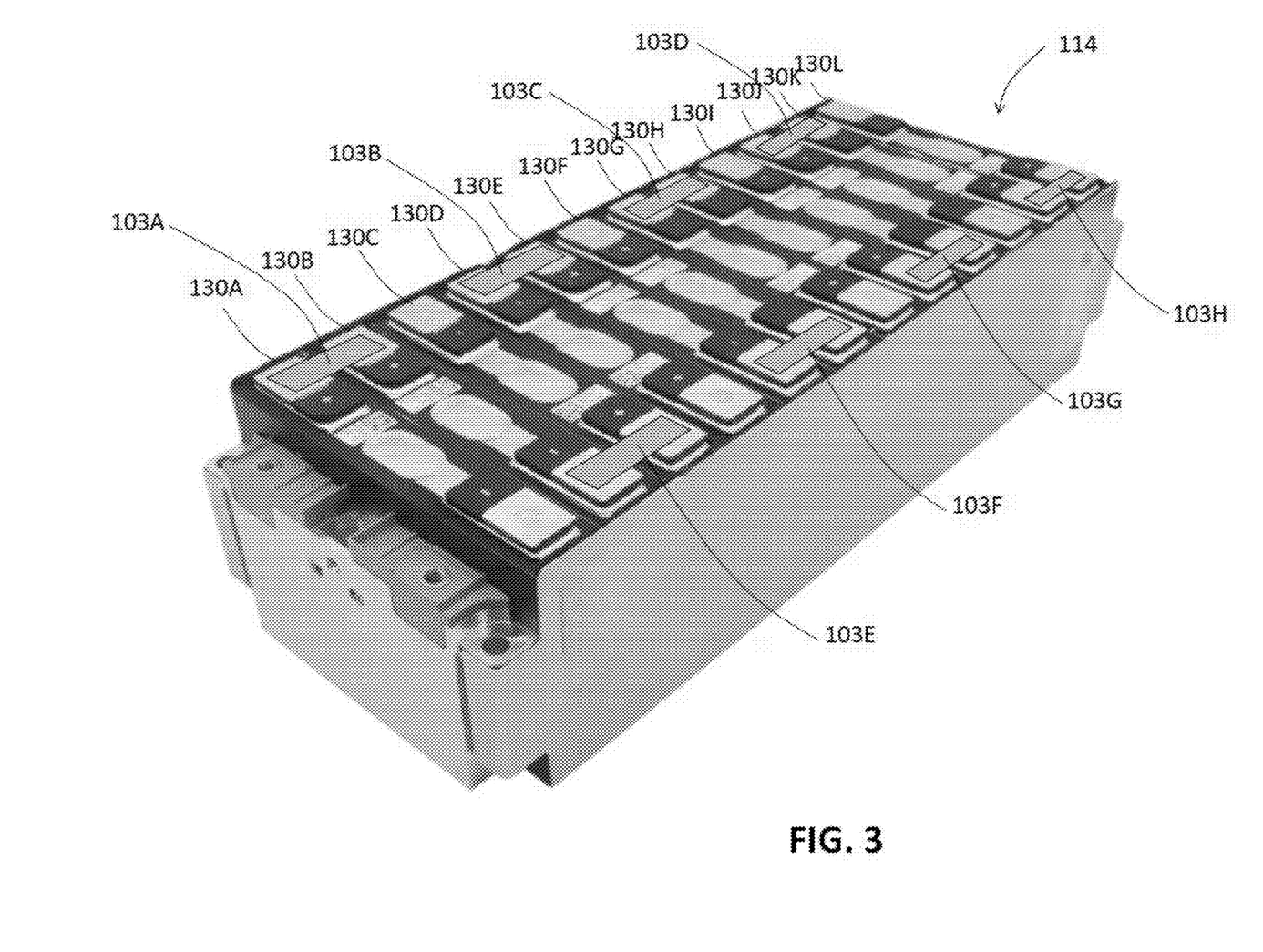
FIG. 3 is a perspective view depicting a battery module comprising a plurality of bi-material battery disconnect brackets electrically coupling a corresponding plurality battery cells, in accordance with an embodiment of the disclosure.

To inhibit such a chain reaction thermal event, individual cells experiencing a thermal event (e.g., an over temperature condition) can be rapidly disconnected from other components within the battery pack 104, thereby electrically disconnecting (e.g., removing the load) from the individual cell experiencing the thermal event with a goal of inhibiting a larger order thermal runaway into adjacent cells, which may be positioned either radially, axially or nearby. For example, with additional reference to FIG. 3, a battery cluster 114 including one or more bi-material battery disconnects 103A-H configured to electrically isolate individual cells 130 upon the detection of an over temperature condition, is depicted in accordance with an embodiment of the disclosure.

Figure 4A:
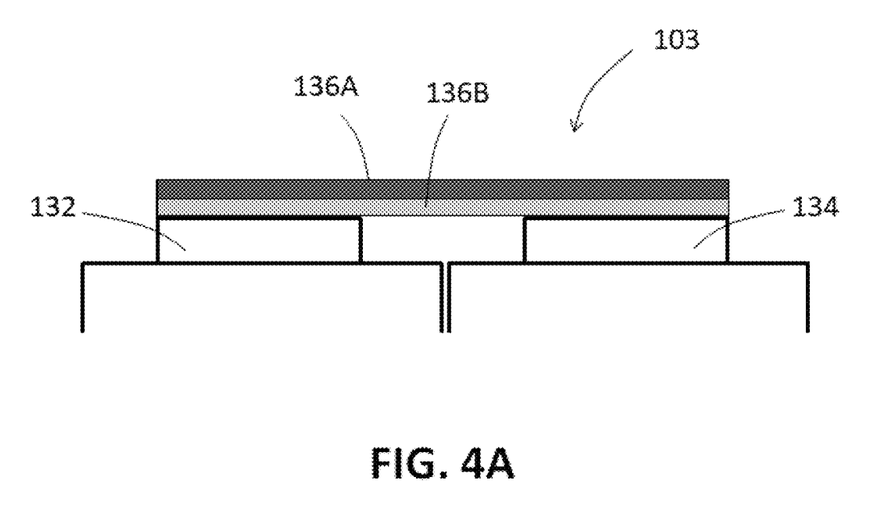
FIG. 4A is a cross-sectional view depicting a bi-material electric vehicle battery disconnect bracket configured to transition between an open, isolation position and a closed, conductive position, wherein the bracket is depicted in the closed, conductive position, in accordance with an embodiment of the disclosure.
Figure 4B:
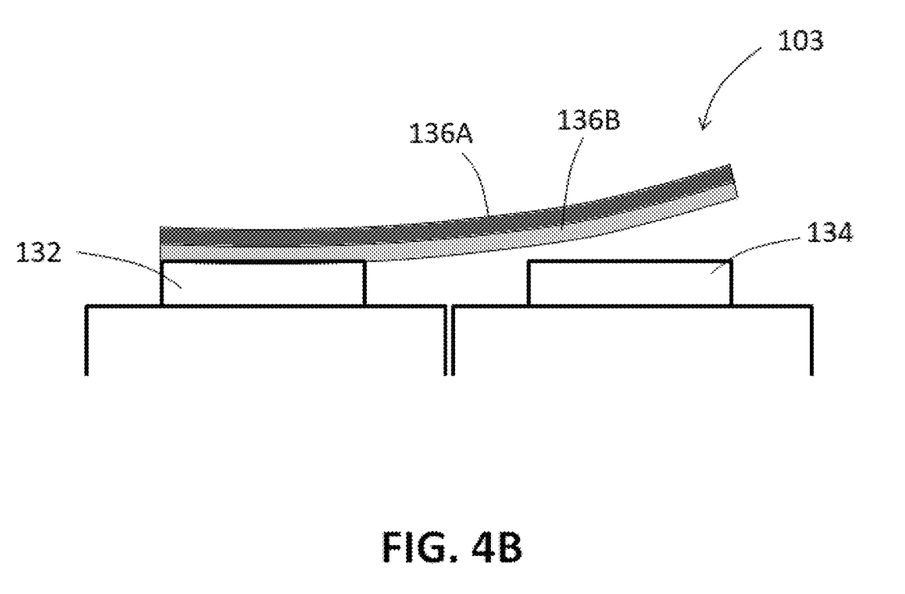
FIG. 4B is a cross-sectional view of the bracket of FIG. 4A, wherein the bracket is depicted in the open, isolation position, in accordance with an embodiment of the disclosure.

With additional reference to FIGS. 4A-B, a bi-material electric vehicle battery disconnect bracket 103 configured to transition between a closed, conductive position (as depicted in FIG. 4A) and an open, isolation position (as depicted in FIG. 4B) is depicted in accordance with an embodiment of the disclosure. As depicted, in some embodiments, the bracket 103 can be configured to selectively electrically couple a first terminal 132 (e.g., a positive terminal) of a first battery cell or module to a second terminal 134 (e.g., a negative terminal) of a second battery cell or module, wherein when the bracket 103 is exposed to a source of heat or is otherwise heated above a designated temperature, the bracket 103 can physically deformed thereby decoupling the first terminal 132 from the second terminal 134.

For example, in some embodiments, the bracket 103 can include a deformable connection body constructed of a layered first material 136A and a second material 136B. In embodiments, the first material 136A can have a different coefficient of thermal expansion than the second material 136B, such that an increase in temperature above a defined threshold experienced by the bracket 103 causes the first material 136A to expand at a larger magnitude/faster rate than the second material 136B, thereby rapidly transitioning the bracket 103 from the equilibrium state of a closed, conductive position to the equilibrium state of an open, isolation position, thereby electrically disconnecting the first terminal 132 from the second terminal 134. Conversely, when the temperature experienced by the bracket 103 decreases below a defined threshold, the first material 136A can contract in size relatively more than the second material 136B, thereby rapidly transitioning the bracket 103 from the open, isolation position equilibrium state, back to the closed, conductive position equilibrium state.

In embodiments, the first and second materials 136A-B can be of a variety of metals, alloys, polymers, composites, or the like, provided that the first material 136A has a relatively larger a coefficient of thermal expansion (e.g., expands and contracts more over a given temperature range) than the second material 136B, and the second material 136B is able to provide an electrical path between the first terminal 132 and a second terminal 134. For example, in one embodiment, the second material 136B can be at least one of an electrically conductive copper or aluminum alloy. Accordingly, in embodiments, the first and second materials 136A-B can be tuned to cause the bracket 103 to selectively transition from one equilibrium state to another equilibrium state at a desired threshold temperature. For example, in one embodiment, the bracket 103 can be configured to transition from the open, venting position to the sealed, closed position at about 140° C. In other embodiments, the valve or port can be configured to transition in a range of between about 100° C. and about 180° C., although other ranges of triggering or threshold temperatures are also contemplated.

In some embodiments, the plurality of brackets 103 can act as switches within a larger battery disconnect system 102, such that transition of any one bracket 103 from a closed, conductive position to an open, isolation position can close a corresponding circuit (e.g., via a direct electrical contact or through a logic circuit) associated with the isolated battery cell, thereby causing the system 102 to automatically execute one or more functions (e.g., rapidly discharge the isolated battery cell, etc.). For example, with additional reference to FIG. 5, a block diagram for a battery disconnect system 102 adapted to isolate and rapidly discharge one or more individual battery cells within a multi-cell battery arrangement to mitigate a propagation of a multi-cell thermal runaway event, is depicted in accordance with an embodiment of the disclosure. As depicted, in addition to the plurality of brackets 103A-C, the battery management system 102 can include an electronic control unit (ECU) 142 operably coupled to a plurality of energy delivery devices (e.g., individual cells 130A-D (e.g., lithium cells), electrically connected in series and/or in parallel.

The ECU 142 or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field programmable gate array (FPGA), for example, or as a combination of hardware and software, such as by a microprocessor system and a set of program instructions that adapt the engine to implement the particular functionality, which (while being executed) transform the microprocessor system into a special-purpose device.

An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques.

Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Figure 5:
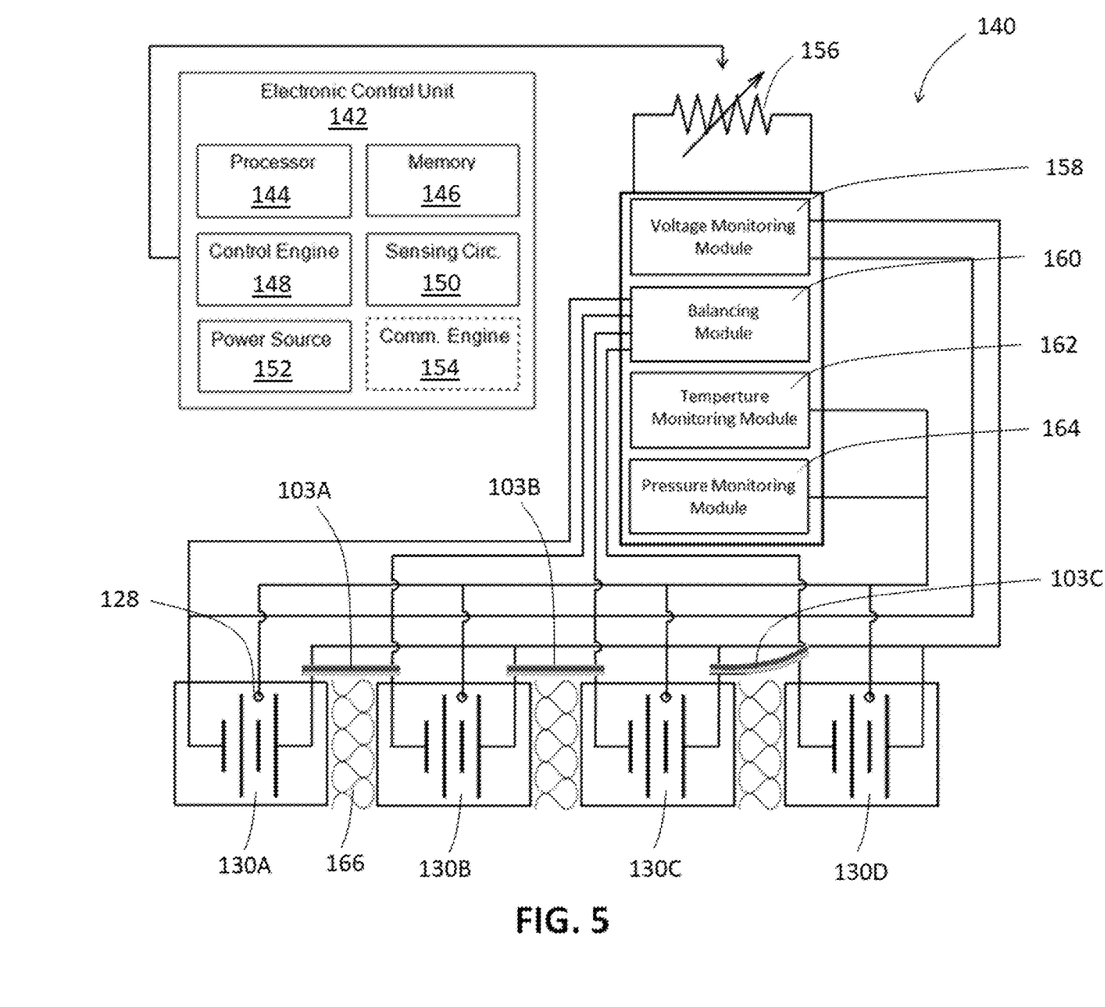
FIG. 5 is a block diagram depicting a battery disconnect system comprising one or more bi-material electric vehicle battery disconnect brackets adapted to isolate and rapidly discharge one or more individual battery cells within a multi-cell battery arrangement to mitigate a propagation of a multi-cell thermal runaway, in accordance with an embodiment of the disclosure.

In some embodiments, ECU 142 can include a processor 144, memory 146, control engine 148, sensing circuitry 150, and power source 152. Optionally, in embodiments, ECU 142 can further include a communications engine 154. Processor 144 can include fixed function circuitry and/or programmable processing circuitry. Processor 144 can include any one or more of a microprocessor, a controller, a DSP, an ASIC, an FPGA, or equivalent discrete or analog logic circuitry. In some examples, processor 144 can include multiple components, such as any combination of one or more microprocessors, one or more controllers, one or more DSPs, one or more ASICs, or one or more FPGAs, as well as other discrete or integrated logic circuitry. The functions attributed to processor 144 herein may be embodied as software, firmware, hardware or any combination thereof.

Memory 146 can include computer-readable instructions that, when executed by processor 144 cause ECU 142 to perform various functions. Memory 146 can include volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Control engine 148 can include instructions to control the components of ECU 142 and instructions to selectively control a flow of electrical power to and from the individual cells 130A-D, thereby enabling both a rapid discharge of any one individual cell 130A-D experiencing abnormal conditions, as well as a balancing of loads between cells 130A-D. For example, based on conditions detected by the sensing circuitry 150 or the vehicle (e.g. other vehicle ECUs), control engine 148 can selectively activate one or more logic sequences (e.g., stored in the control engine 148 or memory 146) to shift an electrical potential between one or more cells 130A-D. In other cases, it may be desirable to rapidly discharge the electrical potential from a given cell, for example through an electrically resistive member 156, which in some embodiments, may have a variable resistance or impedance controllable by the control engine 148. For example, in one embodiment, the resistive member 156 can be the vehicle motor; although the use of other resistive members or combinations of resistive members is also contemplated.

In embodiments, sensing circuitry 150 can be configured to sense a variety of conditions related to each of the cells 130A-D. For example, sensing circuitry 150 can be configured to sense at least one of a temperature, pressure, voltage, amperage, or other ambient condition (e.g., the presence of smoke or fumes, the presence of liquid, etc.) directly or indirectly associated with each cell 130A-D. Accordingly, sensing circuitry 150 can include or can be operable with one or more sensors 128 (e.g., one or more thermocouples, pressure sensors, etc.). In embodiments, sensing circuitry 150 can additionally include one or more modules 158, 160, 162, 164 configured to process and analyze received data related to battery cell 130A-D conditions.

For example, a voltage monitoring module 158 can be configured to receive voltage information associated with each of the individual battery cells 130A-D, condition and isolate the voltage information and provide the voltage information to the processor 144/control engine 148. In some embodiments, following a disconnect by bracket 103, the processor 144 can evaluate the disconnected battery cell 130A-D to determine if the individual battery cell 130A-D is in a potentially damaging state. For example, during charging, an individual cell may temporarily overheat, even though it's respective voltage remains below a desired recharge potential. Similarly, during discharge, the voltage of an individual cell may drop below a minimum safety threshold even though the voltage of the overall battery pack is still above its minimum safety threshold. In such events, the control engine 148 can continue to monitor the isolated battery cell 130A-D, with the options of either reconnecting the battery cell 130A-D if conditions improve, or taking one or more additional steps to neutralize the battery cell 130A-D if conditions worsen.

A balancing module 160 can be configured to evaluate the relative voltage levels of adjacent cells 130A-D pairs and redistribute charge between the adjacent cells 130A-D to mitigate differences in the cell voltages of the pair. That is, in rare cases, the individual cells 130A-D within a given module may discharge unevenly, creating a temperature and voltage differential among the cells 130A-D. Upon the detection of such an event (e.g., opening of bracket 103A-C), the balancing module 160 can affect the transfer of electrical potential from one cell to another, and in extreme circumstances can even fully discharge the electrical potential from a given cell experiencing a problem or perceived abnormal conditions. To affect a greater control over redistribution of electrical potential, in some embodiments, the balancing module 160 can employ one or more resistors 156, which can be variable in nature, to shift the electrical load of one or more cells to other cells within the battery 104.

A temperature monitoring module 162 can receive information corresponding to a temperature of the individual cells 130A-D. Accordingly, in some embodiments, the sensing circuitry 150 can monitor a temperature of the individual battery cells 130A-D as a cross-check to opening/closing of the bracket, and with the goal of maintaining the active cells within a desired temperature range. The temperature information can be in the form of an electrical signal produced by a sensor 128 located within or adjacent to the individual cells 130A-D, although the temperature information can take other forms known in the art. The temperature monitoring module 162 can provide the temperature information to the processor 144/control engine 148.

If, following isolation of anyone of the individual cells 130A-D via the brackets 103, it is verified by the processor 144 that a temperature of at least one of the cells 110 has risen above the desired temperature range, the control engine 148 can open/close one or more switches to route a flow of electrical energy within the bus bar to affect a load shift or rapid discharge of the cell experiencing the abnormal condition. Temperature control can also be afforded via one or more high temperature barricades 166. In some embodiments, these high temperature barricades 166 can be in the form of insulation constructed of a material configured to provide a physical heat barrier to inhibit heat propagation between adjacent cells 130A-D within the multi-cell battery pack 104.

The pressure monitoring module 164 can receive information corresponding to a pressure within or in close proximity to individual cells 130A-D. Accordingly, in some embodiments, the sensing circuitry 150 can monitor a pressure of the individual battery cells 130A-D as a cross-check to opening/closing of the bracket, and with the goal of using the pressure information (potentially in combination with the sensed temperature, voltage, etc.) as an aid in determining whether anyone of the individual cells 130A-D may be experiencing a problem, and may be likely to experience a thermal runaway or other adverse event in the near future. In some embodiments, the pressure information can be in the form of an electrical signal produced by a sensor 128, which can then be fed to the processor 144/control engine 148 to affect a load shift or rapid discharge of the cell experiencing the abnormal condition.

Power source 152 is configured to deliver operating power to the components of ECU 142. Power source 152 can include a battery and a power generation circuit to produce the operating power (e.g., individual battery cells 140, etc.). In some examples, the power source 152 is rechargeable to allow extended operation. Power source 152 can include any one or more of a plurality of different battery types, such as nickel cadmium batteries, lithium ion batteries and the like.

Optionally, communications engine 154 can include any suitable hardware, firmware, software, or any combination thereof for communicating with other components of the vehicle and/or external devices (e.g., charging station, etc.). Under the control of processor 144, communication engine 146 can receive downlink telemetry from, as well as send uplink telemetry to one or more external devices using an internal or external antenna. In addition, communication engine 146 can facilitate communication with a networked computing device and/or a computer network. For example, in some embodiments, the communications engine 154 can be configured to receive information to anticipate energy usage and discharge requirements along the desired route, thereby comparison of actual, sensed conditions of the individual cells 130A-D to expected conditions of the individual cells for a given environmental temperature along the desired travel route.

An electric vehicle battery disconnect system configured disconnect one or more battery cells or modules experiencing a thermal event within a battery pack to mitigate propagation of the thermal event throughout the battery pack, the system comprising: a bracket body formed of a first material on a first major surface of the body, and a second material on an opposing second major surface of the body, the first material having a larger coefficient of thermal expansion than the second material, such that an increase in temperature above a defined threshold experienced by the body causes the first material to expand more than the second material, thereby transitioning the body from a first equilibrium state representing a closed, conductive position to a second equilibrium state representing an open, isolation position.

A system or method according to any embodiment, wherein the first material comprises at least one of a metal, alloy, polymer, or composite, and the second material comprises at least one of an electrically conductive metal having a different coefficient of thermal expansion than the first material.

A system or method according to any embodiment, wherein the second material comprises at least one of a copper or aluminum alloy.

A system or method according to any embodiment, wherein the bracket is a bistable, bimetallic element.

A system or method according to any embodiment, wherein the bracket is tuned to transition from the first equilibrium state to the second equilibrium state at a designated temperature in a range of between about 100° C. and about 180° C.

A system or method according to any embodiment, wherein the bracket is tuned to transition from the first equilibrium state to the second equilibrium state at a temperature above about 140° C.

A system or method according to any embodiment, wherein the bracket is configured to transition from the second equilibrium state to the first equilibrium state at a temperature below about 140° C.

A system or method according to any embodiment, further comprising an electronic control unit.

A system or method according to any embodiment, wherein in the second equilibrium state the bracket body is further configured to close a circuit of the electronic control unit, enabling the electronic control unit to perform one or more functions on one at least partially isolated cell.

A system or method according to any embodiment, further comprising one or more sensors configured to sense at least one of a temperature, pressure, voltage, amperage of the at least partially isolated cell.

A system or method according to any embodiment, wherein the electronic control unit is configured to evaluate at least one of a temperature, pressure, voltage, amperage of the isolated cell to confirm whether the at least partially isolated cell is experiencing a thermal event.

A system or method according to any embodiment, wherein the electronic control unit is configured to rapidly discharge an electrical potential from the at least partially isolated cell through one or more resisters.

A system or method according to any embodiment, wherein the electronic control unit is configured to effect a transfer of electrical potential from the at least partially isolated cell to one or more other battery cells within the battery pack.

An electric vehicle comprising the electric vehicle battery disconnect system according to any embodiment of the disclosure.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. An electric vehicle battery disconnect bracket configured disconnect one or more battery cells or modules experiencing a thermal event within a battery pack to mitigate propagation of the thermal event throughout the battery pack, the bracket comprising:
    a bracket body formed of a first material on a first major surface of the body, and a second material on an opposing second major surface of the body, the first material having a larger coefficient of thermal expansion than the second material, wherein an increase in temperature above a defined threshold experienced by the body causes the first material to expand more than the second material, wherein the bracket body is configured to, upon exceeding said defined threshold, transition from a first equilibrium state representing a closed, conductive position to a second equilibrium state representing an open, isolation position.

2. The electric vehicle battery disconnect bracket of claim 1, wherein the first material comprises at least one of a metal, alloy, polymer, or composite, and the second material comprises at least one of an electrically conductive metal having a different coefficient of thermal expansion than the first material.

3. The electric vehicle battery disconnect bracket of claim 2, wherein the second material comprises at least one of a copper or aluminum alloy.

4. The electric vehicle battery disconnect bracket of claim 1, wherein the bracket is a bistable, bimetallic element.

5. The electric vehicle battery disconnect bracket of claim 1, wherein the bracket is tuned to transition from the first equilibrium state to the second equilibrium state at a designated temperature in a range of between about 100° C. and about 180° C.

6. The electric vehicle battery disconnect bracket of claim 1, wherein the bracket is tuned to transition from the first equilibrium state to the second equilibrium state at a temperature above about 140° C.

7. The electric vehicle battery disconnect bracket of claim 6, wherein the bracket is configured to transition from the second equilibrium state to the first equilibrium state at a temperature below about 140° C.

8. An electric vehicle battery disconnect system configured to disconnect one or more battery cells or modules experiencing a thermal event within a battery pack to mitigate propagation of the thermal event, the system comprising:
    an electronic control unit; and
    a deformable connection body formed of a first material on a first major surface of the body, and a second material on an opposing second major surface of the body, the first material having a larger coefficient of thermal expansion than the second material, wherein an increase in temperature above a defined threshold experienced by the body causes the first material to expand more than the second material, wherein a bracket is configured to, upon exceeding said defined threshold, transition from a first equilibrium state representing a closed, conductive position configured to electrically couple a first terminal of a first battery cell or module to a second terminal of a second battery cell or module to a second equilibrium state representing an open, isolation position configured to decouple the first terminal from the second terminal to at least partially isolate one cell of the one or more battery cells, wherein in the second equilibrium state the body is further configured to close a circuit of the electronic control unit, enabling the electronic control unit to perform one or more functions on the at least partially isolated cell.

9. The electric vehicle battery disconnect system of claim 8, wherein the deformable connection body is tuned to transition from the first equilibrium state to the second equilibrium state at a temperature above about 140° C.

10. The electric vehicle battery disconnect system of claim 8, wherein the deformable connection body is configured to transition from the second equilibrium state to the first equilibrium state at a temperature below about 140° C.

11. The electric vehicle battery disconnect system of claim 8, wherein the deformable connection body is tuned to transition from the first equilibrium state to the second equilibrium state at a designated temperature in a range of between about 100° C. and about 180° C.

12. The electric vehicle battery disconnect system of claim 8, further comprising one or more sensors configured to sense at least one of a temperature, pressure, voltage, amperage of the at least partially isolated cell.

13. The electric vehicle battery disconnect system of claim 8, wherein the electronic control unit is configured to evaluate at least one of a temperature, pressure, voltage, amperage of the isolated cell to confirm whether the at least partially isolated cell is experiencing a thermal event.

14. The electric vehicle battery disconnect system of claim 8, wherein the electronic control unit is configured to rapidly discharge an electrical potential from the at least partially isolated cell through one or more resisters.

15. The electric vehicle battery disconnect system of claim 8, wherein the electronic control unit is configured to effect a transfer of electrical potential from the at least partially isolated cell to one or more other battery cells within the battery pack.

16. The electric vehicle battery disconnect system of claim 8, wherein the first material of the deformable connection body comprises at least one of a metal, alloy, polymer, or composite, and the second material of the deformable connection body comprises at least one of an electrically conductive metal having a different coefficient of thermal expansion than the first material.

17. The electric vehicle battery disconnect system of claim 16, wherein the second material of the deformable connection body comprises at least one of a copper or aluminum alloy.

18. The electric vehicle battery disconnect system of claim 8, wherein the deformable connection body is a bistable, bimetallic element.

19. An electric vehicle battery disconnect bracket configured disconnect one or more battery cells or modules experiencing a thermal event within a battery pack to mitigate propagation of the thermal event throughout the battery pack, the bracket comprising:

a bracket body formed of a first material on a first major surface of the body, and a second material on an opposing second major surface of the body, the first material having a larger coefficient of thermal expansion than the second material, wherein an increase in temperature above a defined threshold experienced by the body causes the first material to expand more than the second material, wherein the bracket body is configured to, upon exceeding said defined threshold, transition from a first equilibrium state representing a closed, conductive position to a second equilibrium state representing an open, isolation position, wherein the first material comprises at least one of a metal, alloy, polymer, or composite, and the second material comprises at least one of an electrically conductive copper or aluminum alloy having a different coefficient of thermal expansion than the first material, and wherein the bracket is tuned to transition from the first equilibrium state to the second equilibrium state at a designated temperature in a range of between about 100° C. and about 180° C.

* * * * *